(12) United States Patent
Fercher

(10) Patent No.: US 7,079,255 B2
(45) Date of Patent: *Jul. 18, 2006

(54) OPTICAL COHERENCE INTERFEROMETRY AND COHERENCE TOMOGRAPHY WITH SPATIALLY PARTIALLY COHERENT LIGHT SOURCES

(75) Inventor: Adolf Friedrich Fercher, Vienna (AT)

(73) Assignee: Carl Zeiss Jena GmbH, Jena (DE)

( * ) Notice: Subject to any disclaimer, the term of this patent is extended or adjusted under 35 U.S.C. 154(b) by 311 days.

This patent is subject to a terminal disclaimer.

(21) Appl. No.: 10/257,420

(22) PCT Filed: Oct. 16, 2001

(86) PCT No.: PCT/EP01/11908

§ 371 (c)(1),
(2), (4) Date: Oct. 10, 2002

(87) PCT Pub. No.: WO02/35179

PCT Pub. Date: May 2, 2002

(65) Prior Publication Data

US 2003/0076506 A1   Apr. 24, 2003

(30) Foreign Application Priority Data

Oct. 26, 2000   (DE) .................................. 100 53 154

(51) Int. Cl.
*G01B 9/02* (2006.01)

(52) U.S. Cl. ..................................... 356/497

(58) Field of Classification Search ............... 356/479, 356/497
See application file for complete search history.

(56) References Cited

U.S. PATENT DOCUMENTS 5,321,501 A * 6/1994 Swanson et al. ............ 356/479
5,579,112 A   11/1996 Sugiyama et al.
5,877,856 A * 3/1999 Fercher ...................... 356/492

(Continued)

FOREIGN PATENT DOCUMENTS

DE   196 24 167   1/1997

(Continued)

OTHER PUBLICATIONS

A. F. Fercher, "Optical Coherence Tomography", *J. Biomed. Opt.* 1 (1996): 157-173.

*Primary Examiner*—Hwa (Andrew) Lee
*Assistant Examiner*—Michael A. Lyons
(74) *Attorney, Agent, or Firm*—Reed Smith LLP

(57) ABSTRACT

An airbag cover is defined by a predetermined breaking line which is introduced into a shaped flat material in a recessed manner. The recesses are achieved by removing material by means of laser radiation. According to the invention, the flat material is provided with a barrier layer. The barrier layer, by reason of its material properties, has greater resistance to removal of material by laser action than the material of the rest of the flat material. The recesses made by removing material extend along the predetermined breaking line in the flat material up to the barrier layer. The barrier layer makes it possible to produce a predetermined breaking line by means of laser machining which allows an exact residual wall thickness of the airbag cover in the area of the predetermined breaking line, so that the tearing strength can be adjusted very accurately, which is critically important for a reliable deployment of an airbag. Further, a method for the efficient production of an airbag cover of this type is indicated.

9 Claims, 2 Drawing Sheets

U.S. PATENT DOCUMENTS

| | | |
|---|---|---|
| 6,002,480 A | 12/1999 | Izatt et al. |
| 6,057,920 A * | 5/2000 | Fercher et al. ............. 356/497 |
| 2003/0072007 A1* | 4/2003 | Fercher ..................... 356/497 |

FOREIGN PATENT DOCUMENTS

| | | |
|---|---|---|
| DE | 100 33 189 | 9/2001 |
| WO | WO 95/33971 | 12/1995 |

* cited by examiner

US 7,079,255 B2

OPTICAL COHERENCE INTERFEROMETRY AND COHERENCE TOMOGRAPHY WITH SPATIALLY PARTIALLY COHERENT LIGHT SOURCES

CROSS-REFERENCE TO RELATED APPLICATIONS

This application claims priority of PCT Application Serial No. PCT/EP01/11908, filed Oct. 16, 2001 and German Application No. 100 53 154.1, filed Oct. 26, 2000, the complete disclosures of which are hereby incorporated by reference.

BACKGROUND OF THE INVENTION a) Field of the Invention

The present invention is directed to the short coherence interferometry "z-scan" or depth scan for measuring the depth position of light-reemitting object structures in optical coherence interferometry (PCI=Partial Coherence Interferometry) and in optical coherence tomography (OCT) by matching the optical length of the reference arm of a two-beam interferometer to the optical length of the measurement arm by means of the interference occurring at the interferometer output.

b) Description of the Related Art

In optical PCI and OCT, depth positions of light-reemitting object structures are measured by means of short coherence interferometry by matching the optical length of the reference arm of a two-beam interferometer to the length of the measurement arm. In this connection, the object 1 forms a mirror of a two-beam interferometer, for example, a Michelson interferometer, as is indicated in FIG. 1. The interferometer is illuminated by a light beam 2 of short coherence length from a short coherence light source 3, for example, a superluminescent diode. The beam splitter 4 splits the illuminating light beam into a measurement beam and a reference beam. The portion of the light beam 2 reflected at the beam splitter 4 travels to the reference mirror 6 of the interferometer as a reference beam 5. The proportion of determination of the z-position is carried out with an accuracy given approximately by the coherence length $$l_c \cong \frac{\lambda^2}{\Delta\lambda}$$

of the light which is used; in this case, $\lambda$ is the mean wavelength and $\Delta\lambda$ is the wavelength bandwidth of the radiation that is used. In order to detect the x-coordinate in OCT, the object 1 is moved in x-direction or, as is indicated in dashed lines in FIG. 1, the measurement beam scans the x-coordinates at the object 1 by means of a rotating or oscillating rotating mirror 11.

There are a number of modifications of this basic method of OCT, some of which are described in the general overview by A. F. Fercher, "Optical Coherence Tomography", *J. Biomed. Opt.* 1 (1996): 157–173. Common to all of these modifications is the need for light sources with spatially coherent light.

Spatially coherent light sources have the characteristic that their temporal coherence, and therefore the coherence length of the emitted light, is also relatively large, which is disadvantageous when used in PCI and OCT. At the present time, typical wavelength bandwidths of the superluminescent diodes used in PCI and OCT are 30 nm, for example. At a typical mean wavelength of 800 nm, this gives a coherence length of about 21 micrometers. However, this results in a rather poor accuracy for determining the z-position compared with other interferometry methods.

Conversely, light sources with short coherence length also have low spatial coherence. While there are also laser light sources with high spatial coherence and very short temporal coherence such as the Titanium-Sapphire laser, the latter is exorbitantly expensive and represents a complicated technology.

Light sources with especially short coherence length include transverse multimode lasers and transverse multimode light emitting diodes (LEDs) on the one hand and broadband spontaneously emitting light sources on the other hand. Further, transversely oscillating superluminescent diodes would also have an extremely short coherence length. Transversely oscillating superluminescent diodes of this kind are obtained when the active zone of these light sources has a thicker construction, which would also appreciably increase their output power (however, they are not yet commercially available due to a lack of possible applications). All of these light sources have only partial spatial coherence. Moreover, the spontaneously emitting light sources do not generate light based on induced emission like lasers, superluminescent diodes and LEDs. These light sources on the one hand and broadband spontaneously emitting light sources on the other hand. Further, transversely oscillating superluminescent diodes would also have an extremely short coherence length. Transversely oscillating superluminescent diodes of this kind are obtained when the active zone of these light sources has a thicker construction, which would also appreciably increase their output power (however, they are not yet commercially available due to a lack of possible applications). All of these light sources have only partial spatial coherence. Moreover, the spontaneously emitting light sources do not generate light based on induced emission like lasers, superluminescent diodes and LEDs. These light sources include incandescent lamps, arc lamps and gas discharge lamps. Halogen bulbs, for instance, emit light in a range of $\lambda$=500 nm to $\lambda$=1300 mm. Coherence lengths of $l_c$=0.9 µm correspond to this. These light sources also have only partial spatial coherence. Their use in OCT would, for example, appreciably improve the attainable z-resolution on the one hand and, due to the simple handling and cheapness of these light sources, would also reduce the cost of PCI and OCT devices.

OBJECT AND SUMMARY OF THE INVENTION

Therefore, it is the primary object of the present invention to provide methods and arrangements for implementing the short coherence interferometry "z-scan" or depth scan for measuring the depth position of light-reemitting object structures in optical coherence interferometry and in optical coherence tomography by matching the optical length of the reference arm of a two-beam interferometer to the optical length of the measurement arm by means of the interference occurring at the output of the two-beam interferometer, which methods and arrangements allow the use of spatially partially coherent light sources.

Figure 1:
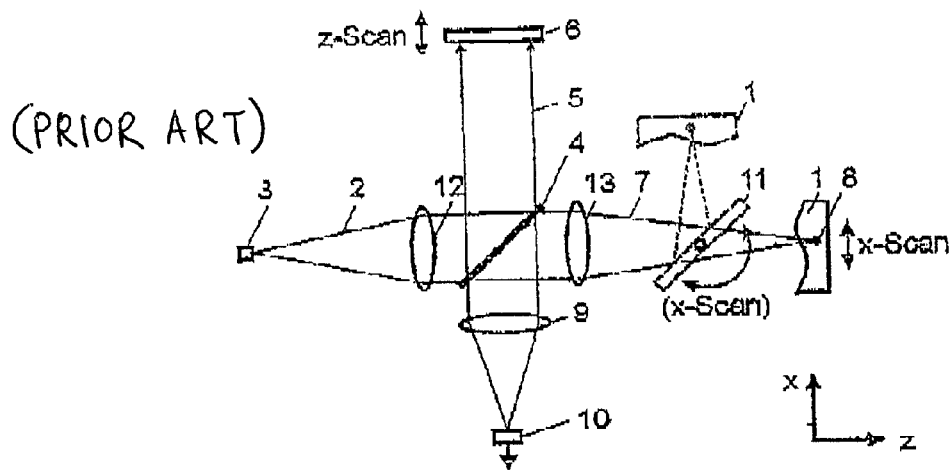
FIG. 1 describes the prior art.

The following reference numbers are used:
1 object
2 light beam of short coherence length
3 short coherence light source
4 beam splitter
5 reference beam
6 reference mirror
7 measurement beam
8 light-reemitting location in the object
9 optics
10 photodetector
11 rotating mirror
12 optics
13 optics
14 primary spatially partially coherent light sources
15 light source image
16 light source image
17 optics
18 reference beam
19 primary spatially partially coherent light source
20 secondary spatially partially coherent light source
21 pinhole diaphragm
22 multimode light-conducting fiber
23 exit surface of the multimode light-conducting fiber
24 connection between optics 17 and reference mirror 6
25 stepping motor
26 displacing table
27 stepping motor

DESCRIPTION OF THE PREFERRED EMBODIMENTS

Figure 2:
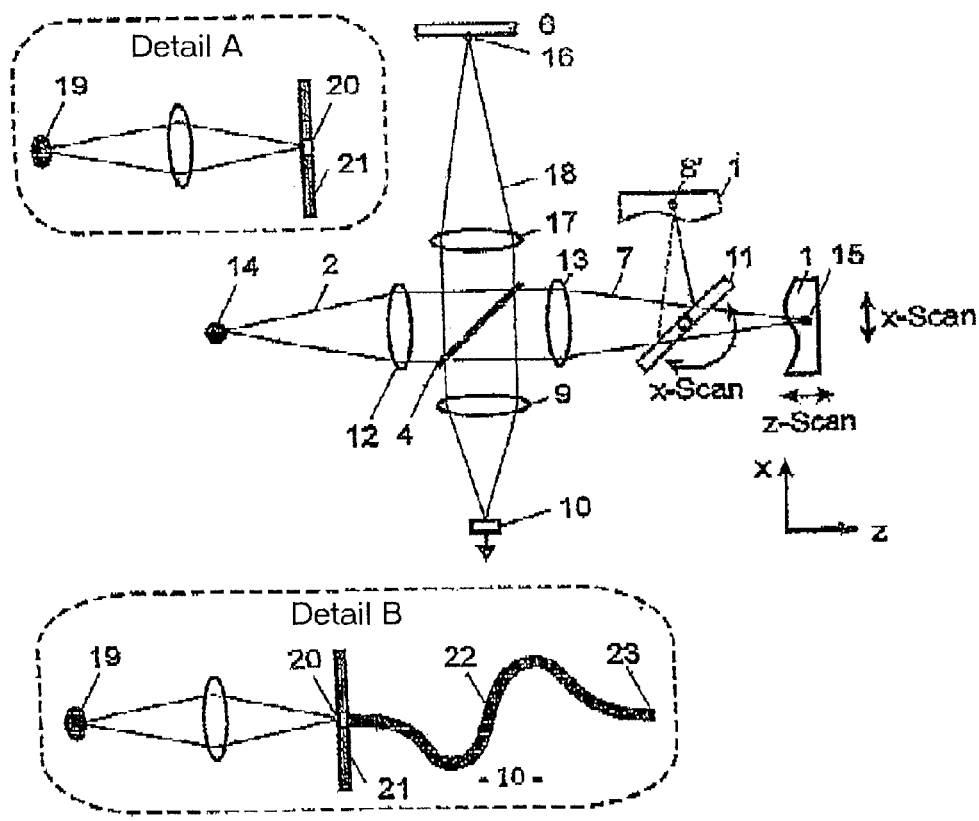
FIG. 2 describes an arrangement according to the invention.

Spatially partially coherent light sources such as transverse multimode lasers, transversely oscillating superluminescent diodes, gas discharge lamps, arc lamps and incandescent lamps are used in the method according to the invention and the object is scanned by the image 15 of these primary light sources 14 or of the secondary light source (20 or 23) derived therefrom by imaging (see FIG. 2).

This is achieved in that the light source is imaged by the measurement light beam path and the reference light beam path on the photodetector 10 in the same scale and in a congruent manner. For this purpose, the optical and geometric light paths from the beam splitter to the reference mirror and to the object must have equal length; and, further, arrangements must be used in the reference beam and in the measurement beam which have identical optical elements with equal focal lengths and glass paths and equal distances between these optical elements in the reference beam and in the measurement beam from the beam splitter 4.

The method according to the invention has some similarity to the Linnik interference microscope (described, for example, in the monograph by W. H. Steel, "Interferometry", Cambridge University Press). Both methods image the light source on the object and reference mirror and, further, on the interferometer output. However, the Linnik interference microscope visualizes the shape of the object surface in relation to the shape of the reference mirror by means of interference fringes in the image of the object at the interferometer output. Therefore, it can only measure surfaces. In contrast, the device described herein scans the object with the image of the light source and synthesizes an image from the interference signals obtained at the interferometer output. Surface images as well as depth images can be obtained.

FIG. 2 shows the arrangement according to the invention using a Michelson interferometer by way of example. However, the method described herein can also be used in any other two-beam interferometer; in this case, the terms "measurement beam" and "reference beam" are used in an analogous sense.

In FIG. 2, a spatially partially coherent primary light source 14 is located at the interferometer input. The light source 14 is imaged in the object 1 in the measurement arm on the one hand through the beam splitter 4 by optics 12 and 13 by the focused measurement beam 7 and on the reference mirror 6 in the reference arm on the other hand by optics 12 and 17 via the beam splitter 4 through the reference beam focused by optics 17. The optics 13 and 17 are located at the same distance from the beam splitter and are identically constructed; they have the same focal length and the same glass paths for the light beams which pass through them. The light source images 15 and 16 are imaged a second time by these optics on the photodetector 10 via the beam splitter 4 and the optics 9. Due to the fact that the optics 13 and 15 have identical optical characteristics and identical distances from the beam splitter, the images of the light source 14 formed on the photodetector 10 via the reference arm and measurement arm are spatially coherent with respect to one another.

FIG. 2 shows that the light source 14 is imaged on the reference mirror 6 and in the object 1, but this is not absolutely necessary. However, it is necessary that the light source 14 is imaged in a congruent manner on the photodetector 10 via the reference arm and via the measurement arm of the interferometer. Otherwise, no interference would occur on the photodetector 10. However, a correlation of the photodetector signals to a determined object region is not readily possible without imaging in the object 1. Instead, a determined photodetector signal would then represent a certain averaging over an object region.

An image 20 of a spatially partially coherent light source 19 can also be used at the location of the light source 14, as is shown in detail A which is indicated in dashed lines in FIG. 2. Such an image 20 of a spatially partially coherent light source 19 is referred to in this instance as a "secondary light source." A pinhole diaphragm 21 at the location of the secondary light source 20 can be used to eliminate superfluous light source components. Further, the secondary light source 20 can also be transmitted by means of a multimode light-conducting fiber 22 at the interferometer input, that is, at the location of the light source 14, as is shown in detail B which is indicated by dashed lines. The brightness distribution of the exit surface 23 of the multimode fiber 22 then functions as a secondary spatially partially coherent light source. Finally, the light source 14 or 19 can also be the exit window of a transverse multimode laser or a transverse superluminescent diode.

In the arrangement shown in FIG. 2, the z-scan is achieved by moving the object 1 in z-direction. Also, the scanning in x-direction which is required for OCT can be realized by moving the object 1 in x-direction. Alternatively, the x-scan can also be achieved in this case by means of a rotating mirror 11 (shown in dashed lines in FIG. 2).

Figure 3:
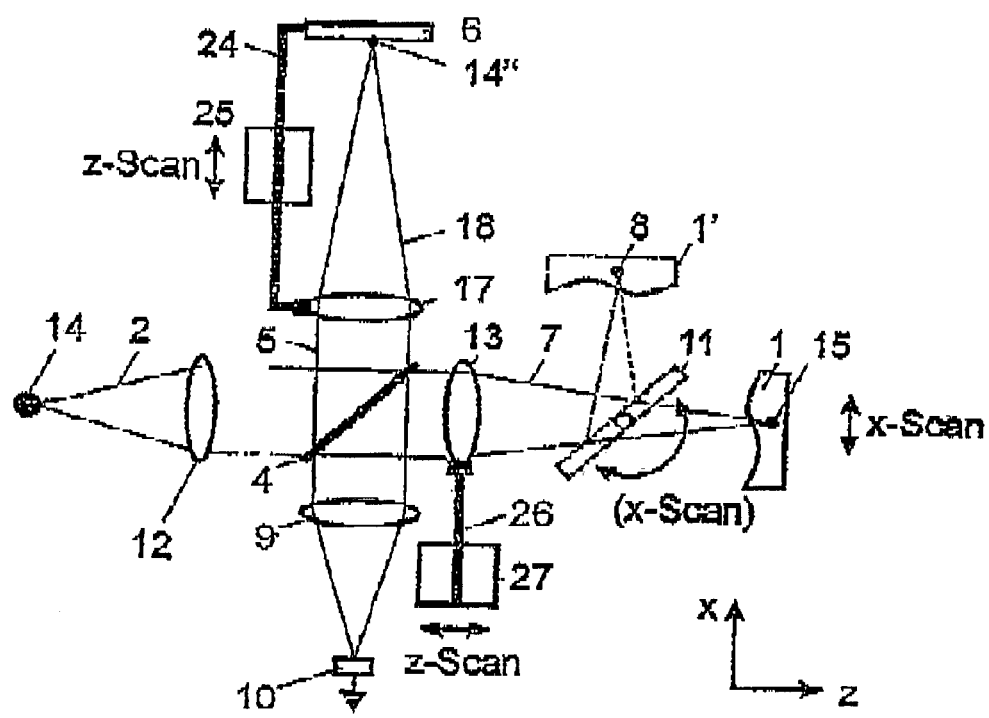
FIG. 3 describes another arrangement according to the invention.

It is not advantageous to carry out the z-scan by displacing the object 1 itself, at least with larger objects. An alternative is shown in FIG. 3.

In this case, the z-scan is achieved by moving the optics 13 along the optical axis by $\Delta z$. For this purpose, the optics 13 are mounted, for example, on a displacing table 26 which is driven by a stepping motor 27. In order to ensure temporal coherence between the measurement beam 7 and the reference beam 18, the optics 13 and 17 must be moved synchronously by the same amount $\Delta z$. Further, the reference mirror 6 must also be moved synchronously with the optics

17 by Δz. This common movement can be ensured by means of a mechanical connection 24 between the optics 17 and reference mirror 6 which is controlled by a stepping motor 25. Since the reference light beam 5 coming from the beam splitter 4 extends parallel in this case, the spatial coherence of the images of the light source 14 is not changed at all by this.

Because of the geometrically optical beam refraction at the surface of the object, movements of the light source image 15 which diverge from the amount of the z-scan can occur in the object. For example, the position of the light source image 15 in the object in case of a plane object surface is displaced by a factor $n.n_G$ greater than a corresponding displacement of the optics 13 (n is the phase index, $n_G$ is the group index of the object 1). In order to compensate for this, the optics 13 are only displaced by $\Delta z/(n.n_G)$. Other corrections are required in case of curved object surfaces.

While the foregoing description and drawings represent the present invention, it will be obvious to those skilled in the art that various changes may be made therein without departing from the true spirit and scope of the present invention.

What is claimed is:

1. A method for carrying out a short coherence interferometry "z-scan" or depth scan for measuring the depth position of a light-reemitting object comprising the steps of:
   illuminating an object by a measurement beam of a two-beam interferometer, the two beams being a spatially partially coherent light, and including the measurement beam and a reference beam;
   interferometrically scanning the object depth by varying the optical path difference between the reference beam and the measurement beam; and
   recording an interferometer response as a function of the object depth defined by the optical path difference.

2. An arrangement for measuring the depth position of a light-reemitting object according to claim 1, comprising a light source which is imaged by a measurement light beam path and a reference light beam path on a photodetector at the two-beam interferometer output in the same size and in a congruent manner.

3. An arrangement for measuring the depth position of a light-reemitting object according to claim 1 wherein:
   the space coherence of the measurement beam and reference beam is provided at a detector of the two-beam interferometer by the use of identical optical elements with identical focal lengths, glass path lengths and distances in both the reference beam and measurement beam.

4. The method according to claim 1, wherein a source for the spatially partially coherent light is one of a transverse multimode laser, transversely oscillating superluminescent diode, gas discharge lamp, arc lamp and incandescent lamp.

5. The method according to claim 4, wherein the step of illuminating an object includes:
   generating a first spatially partially coherent light from a primary light source; and
   deriving the spatially partially coherent light as a secondary light source from the first spatially partially coherent light.

6. The method according to claim 1, wherein the step of illuminating an object includes:
   generating a first spatially partially coherent light from a primary light source; and
   deriving the spatially partially coherent light as a secondary light source from the first spatially partially coherent light.

7. The method according to claim 6, wherein the spatially partially coherent light as the secondary light source is derived by focused or sharp imaging the primary light source.

8. The method according to claim 6, wherein the spatially partially coherent light as the secondary light source is derived by defocused imaging the primary light source.

9. The method according to claim 1, wherein the step of illuminating an object includes transmitting the spatially partially coherent light through a multimode fiber to the two-beam interferometer.

* * * * *

UNITED STATES PATENT AND TRADEMARK OFFICE
CERTIFICATE OF CORRECTION

PATENT NO.       : 7,079,255 B2
APPLICATION NO. : 10/257420
DATED            : July 18, 2006
INVENTOR(S)      : Fercher It is certified that error appears in the above-identified patent and that said Letters Patent is hereby corrected as shown below:

Title Page
Please amend the abstract

[57]                    ABSTRACT

The invention relates to optical coherence interferometry and optical coherence tomography. By scanning the object with images of the light sources, spatially partially coherent light sources such as transverve multimode lasers, transversely oscillating superluminescent diodes, gas discharge lamps, arc lamps and incandescent lamps can be used. Such light sources, for example, halogen incandescent lamps, emit light within a range of $\lambda = 500$ nm to $\lambda = 1300$ nm with coherence lengths of $1=0.9$ µm. These light sources therefore enable considerable improvement in the measuring accuracy of optical coherence interferometry and optical coherence tomography.

Signed and Sealed this

Sixth Day of February, 2007

JON W. DUDAS
*Director of the United States Patent and Trademark Office*